US010848026B2

(12) United States Patent
Masuda (10) Patent No.: US 10,848,026 B2
(45) Date of Patent: Nov. 24, 2020

(54) ELECTRIC LINEAR ACTUATOR

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 10 days.

(21) Appl. No.: 16/241,640

(22) Filed: Jan. 7, 2019

(65) Prior Publication Data

US 2019/0140508 A1    May 9, 2019

Related U.S. Application Data

(63) Continuation of application No. PCT/JP2017/024737, filed on Jul. 5, 2017.

(30) Foreign Application Priority Data

Jul. 8, 2016    (JP) .................................. 2016-135816

(51) Int. Cl.
  *H02K 3/28*    (2006.01)
  *B60T 13/74*    (2006.01)
  (Continued)

(52) U.S. Cl.
  CPC ................ *H02K 3/28* (2013.01); *B60T 13/74* (2013.01); *H02K 1/2793* (2013.01); *H02K 3/04* (2013.01);
  (Continued)

(58) Field of Classification Search
  CPC ...... B60T 13/74; H02K 7/116; H02K 1/2793; H02K 21/24; H02K 3/04; H02K 3/18;
  (Continued)

(56) References Cited

U.S. PATENT DOCUMENTS 6,367,597 B1    4/2002    De Vries et al.
7,528,517 B2    5/2009    Shibukawa et al.
(Continued)

FOREIGN PATENT DOCUMENTS

CN    1262804 A    8/2000
CN    202183664 U    4/2012
(Continued)

OTHER PUBLICATIONS

International Preliminary Report on Patentability dated Jan. 17, 2019 in corresponding International Patent Application No. PCT/JP2017/024737 (10 pages).
(Continued)

*Primary Examiner* — Alex W Mok (57) ABSTRACT

Provided is an electric linear actuator that enables reduction of the mounting space and reduction of costs. An electric motor of this electric linear actuator is an axial gap motor including a stator and a rotor which are disposed such that orientations of magnetic poles which generate interlinkage flux which contributes to torque generation are parallel to the rotation axis of the electric motor. Further, a linear motion mechanism and the electric motor are disposed in line along the same axis which serves as the axis of a rotation input and output shaft of the linear motion mechanism. First and second coil terminals have extended portions extended in the outer-diameter side in the radial direction with respect to the rotation axis, and the extended portions are electrically connected to a control device through a wiring mechanism.

6 Claims, 5 Drawing Sheets

(51) Int. Cl.
*H02K 7/116* (2006.01)
*H02K 3/52* (2006.01)
*H02K 1/27* (2006.01)
*H02K 3/04* (2006.01)
*F16D 65/16* (2006.01)

(52) U.S. Cl.
CPC ............. *H02K 3/522* (2013.01); *H02K 7/116* (2013.01); *F16D 65/16* (2013.01)

(58) Field of Classification Search
CPC . H02K 3/28; H02K 3/522; H02K 7/06; F16D 65/16
USPC .......................................................... 310/198
See application file for complete search history.

(56) References Cited

U.S. PATENT DOCUMENTS

| | | | |
|---|---|---|---|
| 7,810,616 | B2 | 10/2010 | Nakazeki |
| 9,160,219 | B2 | 10/2015 | Takamatsu et al. |
| 9,199,623 | B2 | 12/2015 | Hyun et al. |
| 2006/0279156 | A1 | 12/2006 | Shibukawa et al. |
| 2008/0110704 | A1 | 5/2008 | Nakazeki |
| 2013/0009508 | A1 | 1/2013 | Takamatsu et al. |
| 2013/0099609 | A1* | 4/2013 | Ikeno ................... H02K 11/33 310/52 |
| 2014/0188361 | A1 | 7/2014 | Hyun et al. |
| 2015/0280505 | A1 | 10/2015 | Tanaka et al. |
| 2016/0091039 | A1* | 3/2016 | Masuda .................. F16D 65/18 188/72.1 |
| 2016/0268876 | A1* | 9/2016 | Goto .................... H02K 11/215 |
| 2017/0012480 | A1 | 1/2017 | Woolmer |

FOREIGN PATENT DOCUMENTS

| | | |
|---|---|---|
| CN | 103909918 A | 7/2014 |
| CN | 204231053 U | 3/2015 |
| EP | 1 837 555 A1 | 9/2007 |
| JP | 61-13574 | 1/1986 |
| JP | 2001-332014 | 11/2001 |
| JP | 2003-247576 | 9/2003 |
| JP | 2006-194356 | 7/2006 |
| JP | 2006-345655 | 12/2006 |
| JP | 2008-172859 | 7/2008 |
| JP | 2008-172884 | 7/2008 |
| JP | 2010-270788 | 12/2010 |
| JP | 2012-50312 | 3/2012 |
| JP | 2014-75877 | 4/2014 |
| WO | WO99/02882 | 1/1999 |
| WO | WO 2015/124922 A1 | 8/2015 |

OTHER PUBLICATIONS

Extended European Search Report dated Dec. 12, 2019 in corresponding European Patent Application No. 17824312.7.
International Search Report issued Aug. 29, 2017 in corresponding International Application No. PCT/JP2017/024737.
Notice of Reasons for Refusal, dated May 12, 2020, in corresponding Japanese Application No. 2016-135816 (10 pp.).
Office Action, dated Aug. 4, 2020, in corresponding Chinese Application No. 201780041921.4 (14 pp.).
Communication Pursuant to Article 94(3) EPC, dated Aug. 5, 2020, in corresponding European Application No. 17824312.7 (7 pp.).

* cited by examiner

ELECTRIC LINEAR ACTUATOR

CROSS REFERENCE TO THE RELATED APPLICATION

This application is a continuation application, under 35 U.S.C. § 111(a), of international application No. PCT/JP2017/024737, filed Jul. 5, 2017, which is based on and claims Convention priority to Japanese patent application No. 2016-135816, filed Jul. 8, 2016, the entire disclosure of which is herein incorporated by reference as a part of this application.

BACKGROUND OF THE INVENTION

Field of the Invention

The present invention relates to an electric linear actuator applied to an electric brake device, for example.

Description of Related Art

Electric actuators and electric motors are proposed in the following documents.
1. An electric disc brake device in which, at the outer periphery of a linear motion portion, an electric motor is disposed coaxially with the linear motion portion (Patent Document 1).
2. An electric brake device in which an electric motor is disposed at a shaft that is parallel to a rotation shaft of a linear motion mechanism and that is different from the rotation shaft (Patent Document 2).
3. A double-stator-type axial gap motor having eight poles and nine slots (Patent Document 3).

RELATED DOCUMENT

Patent Document

[Patent Document 1] JP Laid-open Patent Publication No. 2003-247576
[Patent Document 2] JP Laid-open Patent Publication No. 2010-270788
[Patent Document 3] JP Laid-open Patent Publication No. 2008-172884

As for electric brake devices using the electric linear actuators as described in Patent Documents 1 and 2, the mounting space in a vehicle is very limited in general, and thus, their functions need to be realized in as small a space as possible. In addition, for example, in wheel speed control or the like represented by antilock brake systems (abbreviated as ABS), electric brakes are required to have high-speed and high-accuracy braking force control.

For example, in a structure in which an electric motor is disposed at the outer periphery of an actuator as in Patent Document 1, the rotor diameter of the electric motor is increased, and thus, the moment of inertia is increased. Accordingly, responsiveness and control accuracy could be impaired. Meanwhile, the kinetic energy necessary for rotor rotation is proportional to the moment of inertia, thus, in order to realize high-speed response, the instantaneous maximum power consumption is increased, which could increase the cost of a power supply device which supplies electric power. Further, for example, as in the case of an electric disc brake device, when the temperature of the target object, such as a friction pad, which receives the pressure from the actuator, is greatly increased, durability could pose a problem because the electric motor is near the heat source.

For example, in a case where an electric motor and a linear actuator are disposed in parallel to each other as in Patent Document 2, the electric motor and the linear actuator often have cylindrical outer shapes in general, and the two cylinders thereof are located so as to be adjacent to each other, which could cause a certain amount of dead space in the gap therebetween. In addition, a coupling mechanism such as parallel gears is necessary between the electric motor and the linear actuator irrespective of the required specification, which could cause increased cost. In addition to these, each of the electric motor and the linear actuator needs a support structure, and thus, problems of space and cost could arise.

As a motor structure that realizes space saving and high torque, an axial-gap-type synchronous motor as shown in Patent Document 3 is known, for example. However, axial gap motors have large dimensions in the radial direction in general, and thus, if the structure according to Patent Document 1 or Patent Document 2 mentioned above is employed, the mounting space could be increased.

SUMMARY OF THE INVENTION

An object of the present invention is to provide an electric linear actuator that enables reduction of the mounting space and reduction of costs.

An electric linear actuator of the present invention includes:
an electric motor;
a linear motion mechanism having a rotation input and output shaft and configured to convert, through or using the rotation input and output shaft, rotary motion of the electric motor into linear motion of a linear motion portion;
a housing configured to hold the linear motion mechanism; and
a control device configured to control the electric motor.
The linear motion mechanism and the electric motor are disposed in line along a same axis which serves as an axis of the rotation input and output shaft of the linear motion mechanism.
The electric motor includes a stator and a rotor which are disposed such that orientations or directions of magnetic poles which generate interlinkage flux which contributes to torque generation are parallel to a rotation axis of the electric motor.
The stator includes an excitation mechanism which includes a coil configured to convert current applied to the electric motor into the interlinkage flux.
The electric linear actuator further includes a wiring mechanism configured to electrically connect the coil and the control device.
One or both of opposite end portions of a winding of the coil have an extended portion extended in a radial direction with respect to the rotation axis, and the extended portion is connected to the wiring mechanism.

According to this configuration, the electric motor is a so-called axial gap motor which includes a stator and a rotor which are disposed such that the orientations of magnetic poles which generate interlinkage flux which contributes to the torque generation are parallel to the rotation axis of the electric motor. Further, the linear motion mechanism and the electric motor are disposed in line along the same axis which serves as the axis of the rotation input and output shaft of the linear motion mechanism. Thus, compared with a structure or the like in which the electric motor and the linear actuator are disposed in parallel to each other, useless space is reduced and space saving can be achieved. In addition, an electric linear actuator that has a small moment of inertia and high responsiveness can be realized.

The stator includes an excitation mechanism, and the excitation mechanism includes a coil. When current is applied to the electric motor by the control device, the coil converts the current into interlinkage flux. The wiring mechanism electrically connects the coil and the control device. One or both of the opposite end portions (coil terminal) of the winding of the coil have an extended portion extended in the radial direction with respect to the rotation axis, and the extended portion is connected to the wiring mechanism. Since the coil terminal has the extended portion extended in the radial direction with respect to the rotation axis, connection between the coil of the electric motor and the control device is facilitated, which is advantageous in achieving cost reduction and space saving. Accordingly, the mounting space can be reduced and the cost can be reduced.

The winding forming the coil may have a rectangular-shaped cross section on a plane that contains an axis of the winding. The winding may be disposed such that: a longitudinal direction of the rectangular-shaped cross section of the winding is orthogonal to the rotation axis; and a transverse direction, which is perpendicular to the longitudinal direction, of the rectangular-shaped cross section of the winding is parallel to the rotation axis. The winding may be wound so as to be stacked in the transverse direction.

An extended portion of one of the opposite end portions of the winding may be extended to an outer-diameter side in the radial direction with respect to the rotation axis, and an extended portion of another of the opposite end portions of the winding may be extended to an inner-diameter side in the radial direction with respect to the rotation axis.

The winding has a rectangular-shaped cross section on a plane that contains the axis of the winding. As the winding having such a rectangular-shaped cross section, a flat wire can be applied, for example. Since the winding is wound so as to be stacked in the transverse direction, the electric motor can be made compact in the axial direction of the rotation axis, and further space saving can be achieved. When a coil wound in a one-layer manner with use of the flat wire is used, it is possible to form a stator that has high heat dissipation performance and that is excellent in "space factor" which is the proportion of the conductor in the cross section of the winding.

In a case where the extended portion of one of the opposite end portions of the winding is extended in the outer-diameter side in the radial direction with respect to the rotation axis and the extended portion of the other of the opposite end portions of the winding is extended in the inner-diameter side in the radial direction with respect to the rotation axis, the wiring length can be reduced. Therefore, this configuration is preferable in achieving loss reduction and material cost reduction.

The winding forming the coil may have a rectangular-shaped cross section on a plane that is parallel to the axis of the winding. The winding may be disposed such that: a longitudinal direction of the rectangular-shaped cross section of the winding is parallel to the rotation axis; and a transverse direction of the rectangular-shaped cross section of the winding is orthogonal to the rotation axis. The winding may be wound so as to be stacked in the transverse direction. As the winding in this case, a flat wire can be applied, for example. Since the winding is wound so as to be stacked in the transverse direction, the stator can be accommodated in a compact manner in the housing or the like, for example, although depending on the number of turns.

An extended portion of one of the opposite end portions of the winding may be extended to an outer-diameter side in the radial direction with respect to the rotation axis, and an extended portion of another of the opposite end portions of the winding may be extended in parallel to an axial direction of the rotation axis. In this configuration, in a case where the extended portion of the other of the end portions is connected to a so-called neutral point, the wiring length can be reduced. Accordingly, loss reduction and material cost reduction can be achieved.

The excitation mechanism may include coil groups that correspond to respective phases of three-phase alternating current.

In the wiring mechanism, star connection may be formed such that the coils have at least one neutral point, the extended portion of the other of the opposite end portions of the winding may be connected to the neutral point, and the extended portion of the one of the opposite end portions of the winding may be connected to the control device which controls the three-phase alternating current.

According to this configuration, the extended portion of the other of the end portions which is extended to the inner-diameter side in the radial direction or in parallel to the axial direction is connected to the neutral point. Thus, for example, compared with a configuration in which delta connection is provided, the wiring length can be assuredly reduced and loss reduction and material cost reduction can be achieved. Since the extended portion of the one of the end portions that is extended in the outer-diameter side in the radial direction is connected to the control device which controls three-phase alternating current, electric connection between the coil and the control device can be easily performed through a connector or the like.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

DESCRIPTION OF EMBODIMENTS

Figure 1:
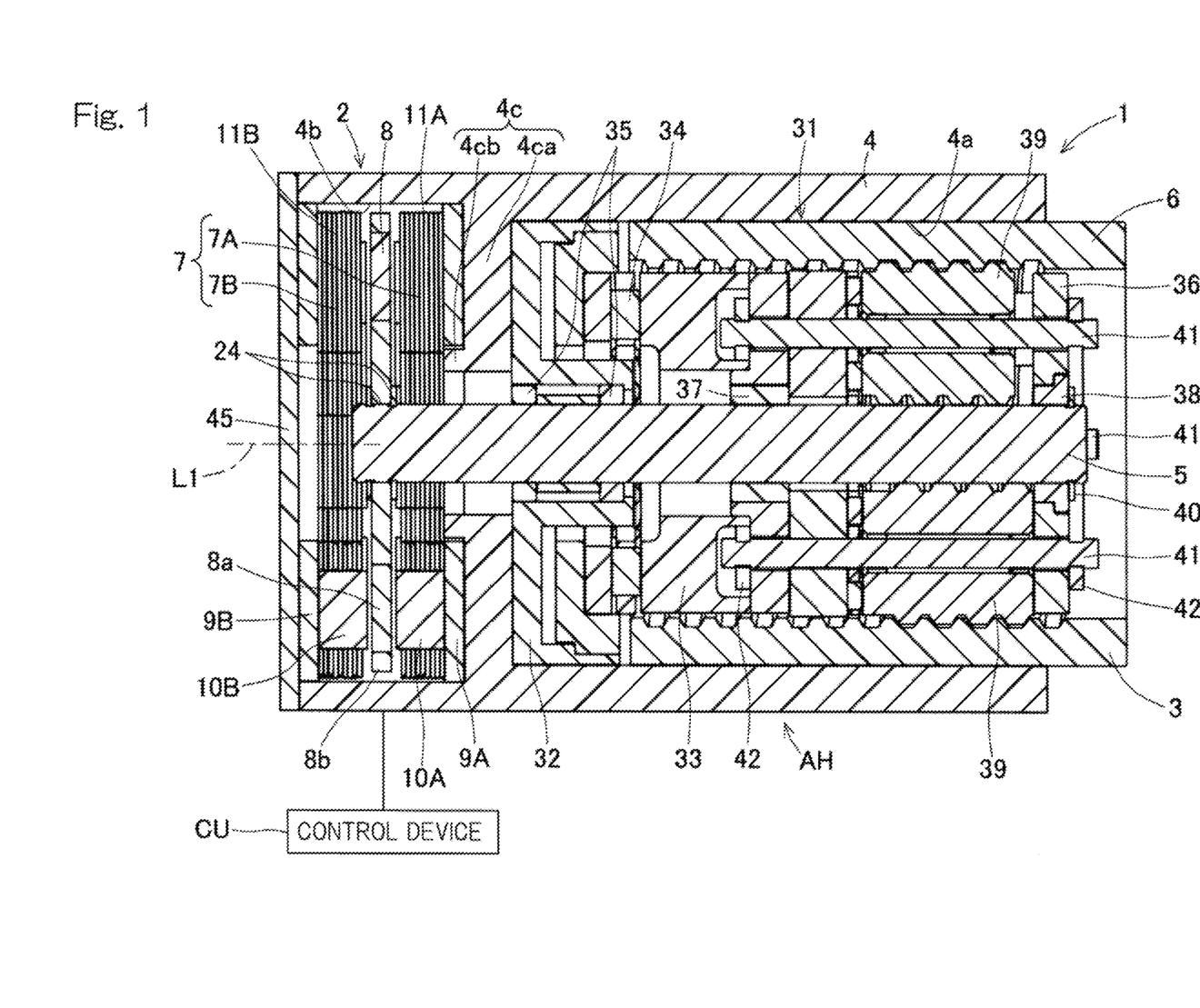
FIG. 1 is a longitudinal sectional view of an electric linear actuator according to one embodiment of the present invention.

An electric linear actuator according to one embodiment of the present invention is described with reference to FIG. 1 to FIG. 3. This electric linear actuator is applied to an electric brake device (described later) mounted to a vehicle, for example. As shown in FIG. 1, this electric linear actuator 1 is an actuator in which an electric motor 2 and a linear motion mechanism 3 are connected in series in the axial direction. The linear motion mechanism 3 and the electric motor 2 are disposed in tandem fashion or in line along the same axis which serves as the axis of a rotation input and output shaft 5 of the linear motion mechanism 3. The electric linear actuator 1 includes: a linear actuator body AH; and a control device CU which controls the electric motor 2.

The linear actuator body AH includes the electric motor 2, the linear motion mechanism 3, and a housing 4. The electric motor 2 of this example is a double-stator-type axial gap motor. The linear motion mechanism 3 includes a linear motion portion 6, and converts rotary motion of the electric motor 2 into linear motion of the linear motion portion 6 through the rotation input and output shaft 5. The housing 4 holds the linear motion mechanism 3 and the electric motor 2. For simplicity, some components such as wires are not shown in FIG. 1.

The electric motor 2 is described. The electric motor 2 is of a so-called axial gap type that includes a stator 7 and a rotor 8 which are disposed such that the orientations of the magnetic poles which generate interlinkage flux which contributes to the torque generation are parallel to the rotation axis of the electric motor 2. The stator 7 is statically held with respect to the housing 4. The rotor 8 is statically held with respect to the rotation input and output shaft 5 of the linear motion mechanism 3, and generates a rotational torque due to the interlinkage flux caused in association with the stator 7 which is disposed with a gap with respect to the rotor 8. The rotor 8 is a magnetic field mechanism that has torque generation surfaces at the respective faces in the axial direction of the rotor 8. The expression "statically" above means a relationship in which motions are substantially synchronous (in other words, constrained relative to each other) excluding the influence of clearances and the like.

The electric motor 2 is provided in the housing 4 having a cylindrical shape. A linear motion mechanism accommodation portion 4a which accommodates most of the linear motion mechanism 3; a motor accommodation portion 4b which accommodates the electric motor 2; and a separation wall 4c which separates the linear motion mechanism accommodation portion 4a from the motor accommodation portion 4b are provided in the housing 4. The motor accommodation portion 4b is provided at one end side in the axial direction in the housing 4, and the linear motion mechanism accommodation portion 4a is provided at the other end side in the axial direction in the housing 4.

The separation wall 4c includes a separation wall body portion 4ca and a boss portion 4cb. The separation wall body portion 4ca is provided so as to be perpendicular to the axial direction of the rotation input and output shaft 5. The separation wall body portion 4ca has formed therein a through-hole through which the rotation input and output shaft 5 is inserted from the linear motion mechanism accommodation portion 4a to the motor accommodation portion 4b. The boss portion 4cb has a cylindrical shape which extends by a predetermined distance in the axial direction (to the motor accommodation portion 4b side) from an inner-diameter-side end portion of the separation wall body portion 4ca. A motor cover 45 is provided which closes the opening end at the electric motor 2 side (the one end side in the axial direction) of the housing 4 in a state where the electric motor 2 is accommodated in the motor accommodation portion 4b of the housing 4.

The stator 7 includes a pair of excitation mechanisms 7A, 7B, which are disposed so as to be opposed to each other at both sides in the axial direction of the rotor 8. Of the excitation mechanisms 7A, 7B, the one at the separation wall 4c side is defined as a first excitation mechanism 7A, and the other at the motor cover 45 side is defined as a second excitation mechanism 7B. The first excitation mechanism 7A includes a magnetic body core 10A, a back yoke 9A, and a first coil 11A. The second excitation mechanism 7B includes a magnetic body core 10B, a back yoke 9B, and a second coil 11B.

The first excitation mechanism 7A is described. The back yoke 9A is provided so as to be in contact with the separation wall 4c in the motor accommodation portion 4b of the housing 4. The magnetic body core 10A is provided so as to protrude in the axial direction from the back yoke 9A. A plurality of the magnetic body cores 10A are provided at a constant interval in the circumferential direction. Each magnetic body core 10A is composed of stacked steel plates, a dust core, or the like, for example. The first coil 11A is wound on each magnetic body core 10A. The first coil 11A converts the current applied to the electric motor 2 into the aforementioned interlinkage flux.

The second excitation mechanism 7B is described. The back yoke 9B is provided so as to be in contact with the motor cover 45 in the motor accommodation portion 4b of the housing 4. The magnetic body core 10B is provided so as to protrude in the axial direction from the back yoke 9B. Similar to the magnetic body core 10A, a plurality of the magnetic body cores 10B are also provided at a constant interval in the circumferential direction. The second coil 11B is wound on each magnetic body core 10B.

The other configurations of the magnetic body core 10B and the second coil 11B are the same as those of the magnetic body core 10A and the first coil 11A described above. When the magnetic body core 10A and the magnetic body core 10B each composed of stacked steel plates, a dust core, or the like are used, the torque per unit copper loss is improved, and such a configuration is considered to be preferable. However, instead of the magnetic body cores, air-core coils which are effective in reduction of costs of components and reduction of torque variation may be employed.

The stator structure and the like are described. Chart (A) of FIG. 2 is a perspective view showing a schematic shape of the entirety of the stator 7 of the axial gap motor used in the electric linear actuator 1 shown in FIG. 1. In chart (A) of FIG. 2, the central axis L1 of the cylindrical boss portion 4cb corresponds to the rotation axis of the electric linear actuator 1. In the description of the stator structure and the wiring mechanism below, since the first and second excitation mechanisms 7A, 7B of the stator 7 (FIG. 1) have the same configuration, the first excitation mechanism 7A is mainly described and description of the second excitation mechanism 7B (FIG. 1) is omitted as appropriate.

Figure 2:
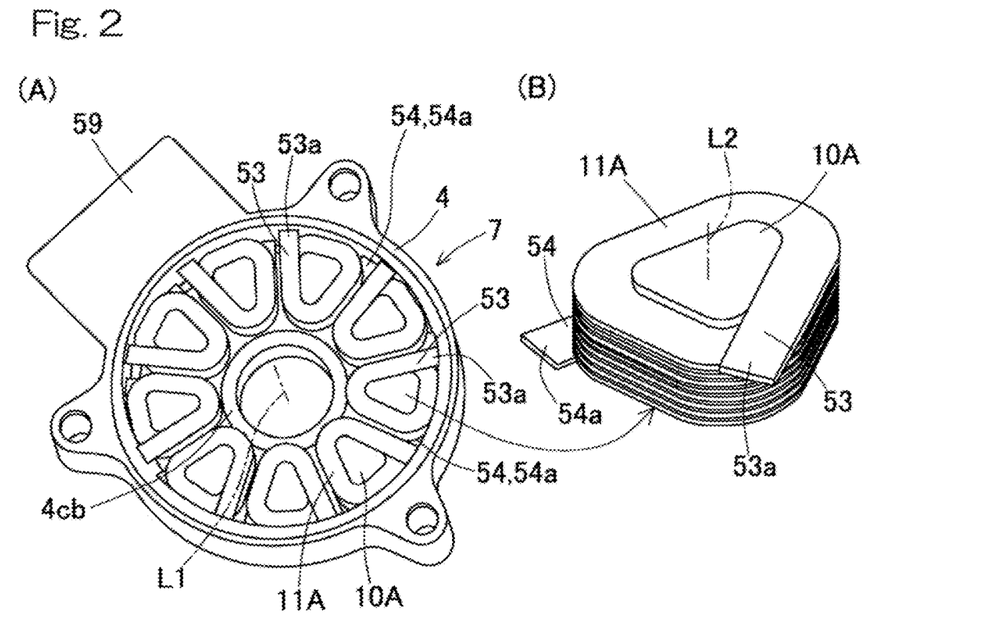
FIG. 2 shows a stator of an electric motor in the electric linear actuator, in which Chart (A) is a perspective view showing a schematic shape of the entirety thereof, and Chart (B) is an enlarged perspective view showing the shape of only a coil of the stator.

Chart (A) of FIG. 2 shows an example of a structure of the stator 7 in which flat wire coils with nine slots are provided. The number of slots is not limited to nine, and is determined as appropriate in accordance with the design. As in the case shown in chart (A) of FIG. 2, when a coil 11A wound in a one-layer manner with use of a flat wire is used, it is possible to form the stator 7 that has high heat dissipation performance and that is excellent in "space factor" which is the proportion of the conductor in the cross section of the winding. Thus, such a configuration is considered to be preferable.

As shown in chart (B) of FIG. 2, opposite end portions (first and second coil terminals 53, 54) of the winding forming the flat wire coil 11A respectively have extended portions 53a, 54a which are extended to the outer-diameter side in the radial direction with respect to the central axis (rotation axis) L1. As shown in FIG. 3, the extended portions 53a, 54a are electrically connected to the control device CU through a wiring mechanism 55. However, the extended portions 53a, 54a of the first and second coil terminals 53, 54 of the coil wound on each magnetic body core 10A are disposed so as to be at different phases from each other. That is, the extended portion 53a of the first coil terminal 53 is extended to the outer-diameter side in the radial direction, and in the direction extended from one side of each magnetic body core 10A which is a substantially isosceles triangle having round corners in a plan view shown in chart (B) of FIG. 2, for example. The extended portion 54a of the second coil terminal 54 is extended to the outer-diameter side in the radial direction, and in the direction extended from another side that is adjacent to the one above-mentioned side in the magnetic body core 10A.

Figure 3:
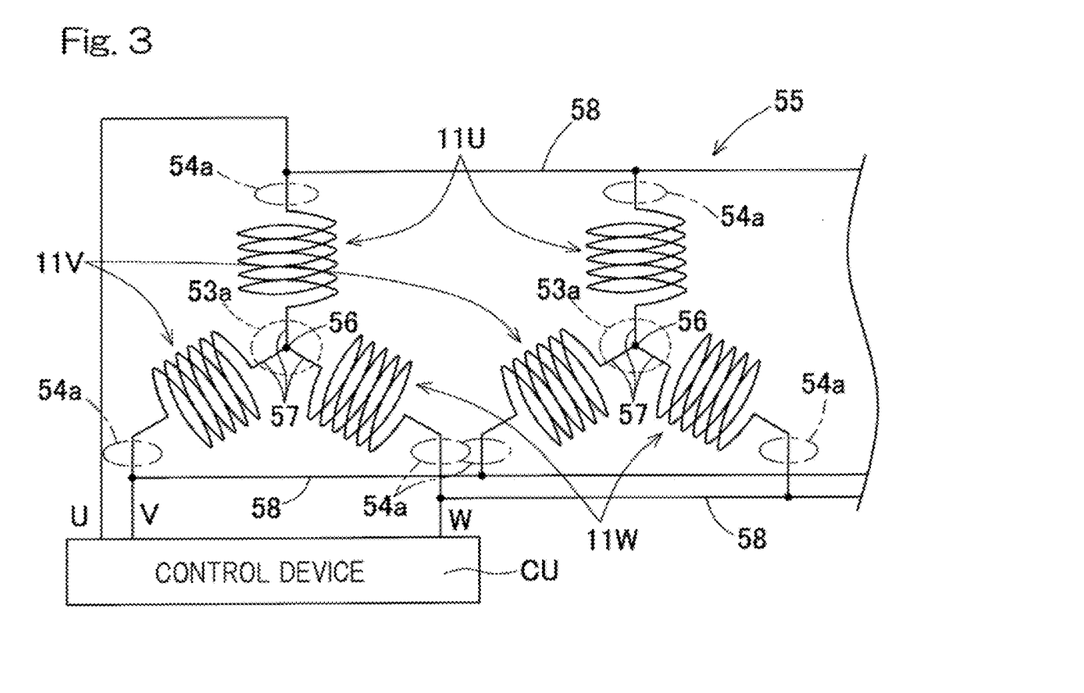
FIG. 3 is a diagram showing an example of a wiring mechanism which electrically connects the coil and a control device.

FIG. 3 shows an example of the wiring mechanism 55. This example shows a configuration in which three-phase alternating current synchronous motor circuits in star connection are connected in parallel. As shown in FIG. 3, the first excitation mechanism 7A shown in chart (A) of FIG. 2 and forming the stator 7 includes: coil groups 11U, 11V, 11W which correspond to the respective phases (U-phase, V-phase, W-phase) of three-phase alternating current. In the wiring mechanism 55, for each circuit, a star connection is formed so as to have a neutral point 56, and the extended portion 53a of each first coil terminal 53 is connected to a neutral point 56 through a bus bar 57, for example. The neutral point 56 is provided separately or independently for each circuit. In the wiring mechanism 55, the extended portion 54a of each second coil terminal 54 is connected through a bus bar 58, for example, to the control device CU which controls the three-phase alternating current.

The bus bars 57, 58 are electrically insulated from one another, and are each insert-molded, in an annular shape, into an outer peripheral portion of a stator housing (having a main part in a substantially hollow disk shape of which inner periphery and outer periphery have thick edges) included in the housing 4, for example. The extended portion 54a of each second coil terminal 54 is connected to a bus bar 58, and the bus bar 58 is connected, in a predetermined relationship, to the terminal of a connector 59. The connector 59 is provided so as to protrude radially outward from the outer peripheral portion of the housing 4. Each bus bar 58 is connected to the control device CU through the connector 59. If the structure is employed in which the bus bar 58 is connected to the control device CU through the connector 59, the stator 7 and the wiring mechanism 55 that are space saving and highly reliable can be realized, and thus, the structure is considered to be preferable. However, the present invention is not limited to this structure.

For example, another member inserted, when the bus bars 57 and 58 are electrically insulated from one another, may be separately provided as a wiring member to the housing 4. Another structure may be employed in which: wiring is performed by use of a coil member or a harness; and the wires are fixed by a varnish or the like. Alternatively, for example, in such a case of a mechanically and electrically integrated structure where a control board is disposed in the vicinity of a motor, with no connector 59 used, end portions of bus bars may be exposed as terminals, or alternatively, the end portions may be connected to a harness inside the housing 4 and the harness may be directly extended to the outside of the housing 4, for example.

As shown in FIG. 1, or as understood from chart (B) of FIG. 2, the winding forming the flat wire coil 11A has a rectangular-shaped cross section on a plane that contains the axis L2 (parallel to the central axis L1) of this winding. The winding is disposed such that: the longitudinal direction of the rectangular-shaped cross section of the winding is orthogonal to the rotation axis L1; and the transverse direction of the rectangular-shaped cross section of the winding is parallel to the rotation axis L1. The winding is wound so as to be stacked in the transverse direction. The winding is not limited to a flat wire, and a true square wire or a round wire can also be used.

As shown in FIG. 1, the rotor 8 is a disk-shaped member which includes: a permanent magnet 8a; and a holder 8b which holds the permanent magnet 8a, for example. The holder 8b is formed from a nonmagnetic material such as resin or stainless steel, for example. As described above, when the stator 7 is configured as an excitation mechanism that includes the first and second coils 11A, 11B, the rotor 8 is configured as a magnetic field mechanism using the permanent magnet 8a, and the electric motor 2 is a permanent magnet synchronous motor, such a configuration is excellent in durability, torque density, and the like, and is considered to be preferable for an electric linear actuator.

The rotor 8 is fixed to an end portion of the rotation input and output shaft 5 of the linear motion mechanism 3. In the example shown in FIG. 1, the rotor 8 is positioned and fixed in the axial direction by being sandwiched or held by two retaining rings 24, 24, at the outer peripheral surface of an end portion, of the rotation input and output shaft 5, that is in the motor accommodation portion 4b. Annular grooves which fix the two retaining rings 24, 24 are formed in the outer peripheral surface of the end portion of the rotation input and output shaft 5, respectively.

Thus, the rotor 8 is fixed by the retaining rings 24, 24 with respect to the rotation input and output shaft 5, at an axial position that corresponds to the space between the first excitation mechanism 7A and the second excitation mechanism 7B. The rotation axis of the electric motor 2 is disposed coaxially with the rotation input and output shaft 5 of the linear motion mechanism 3. Other than this, although not shown, a positioning structure, in the circumferential direction of the rotation axis, which enables torque transmission from the rotor 8 to the rotation input and output shaft 5 can be realized by use of plane processing, spline, fitting friction force, welding, or the like.

The linear motion mechanism 3 is described. Most of the linear motion mechanism 3 is accommodated in the linear motion mechanism accommodation portion 4*a* of the housing 4. The linear motion mechanism 3 applies a braking force to a later-described brake rotor by the output from the electric motor 2. The linear motion mechanism 3 converts rotary motion of the electric motor 2 into linear motion of the linear motion portion 6 through the rotation input and output shaft 5.

The linear motion mechanism 3 includes: the rotation input and output shaft 5 which is rotationally driven by the electric motor 2; and a conversion mechanism portion 31 which converts rotary motion of the rotation input and output shaft 5 into linear motion. The conversion mechanism portion 31 includes: the linear motion portion 6; a bearing case 32; a back plate 33 which is an annular thrust plate; a thrust bearing 34 which holds reaction force against the axial load associated with linear motion of the linear motion portion 6; a radial bearing 35; a carrier 36; slide bearings 37, 38, and a planetary roller 39.

The linear motion portion 6 having a cylindrical shape is supported by the inner peripheral surface of the linear motion mechanism accommodation portion 4*a*, such that the linear motion portion 6 is prevented from rotating and is movable in the axial direction. At the inner peripheral surface of the linear motion portion 6, a helical projection is helically formed so as to protrude in the radially inward direction. A plurality of the planetary rollers 39 are meshed with this helical projection.

The bearing case 32 is provided at one end side in the axial direction of the linear motion portion 6 in the linear motion mechanism accommodation portion 4*a*. The bearing case 32 includes: a boss portion having a cylindrical shape; and a flange portion which extends radially outward from the boss portion. A plurality of the radial bearings 35 are fitted in the boss portion, and the rotation input and output shaft 5 is fitted to the inner diameter surfaces of the inner rings of these radial bearings 35. The rotation input and output shaft 5 is rotatably supported by the bearing case 32 through the plurality of the radial bearings 35.

The carrier 36 rotatable about the rotation input and output shaft 5 is provided at the inner periphery of the linear motion portion 6. The carrier 36 is rotatably supported by the rotation input and output shaft 5 by the slide bearings 37, 38 fitted between the carrier 36 and the rotation input and output shaft 5. A retaining ring 40 which constrains the axial position of the rotation input and output shaft 5 and the carrier 36 with respect to the bearing case 32 is provided at an end portion in the axial direction of the rotation input and output shaft 5.

The carrier 36 has a plurality of roller shafts 41 spaced from each other in the circumferential direction. A plurality of shaft insertion holes are formed in each of opposite end portions in the axial direction of the carrier 36. Each shaft insertion hole is formed as an oblong hole extending by a predetermined distance in the radial direction. Opposite end portions in the axial direction of each roller shaft 41 are respectively inserted in the corresponding shaft insertion holes, whereby the roller shaft 41 is supported so as to be movable in the radial direction within the range of the shaft insertion holes. An elastic ring 42 is extended over the end portions at each side in the axial direction of the plurality of the roller shafts 41, so as to urge the roller shafts 41 in the radially inward direction.

Figure 7:
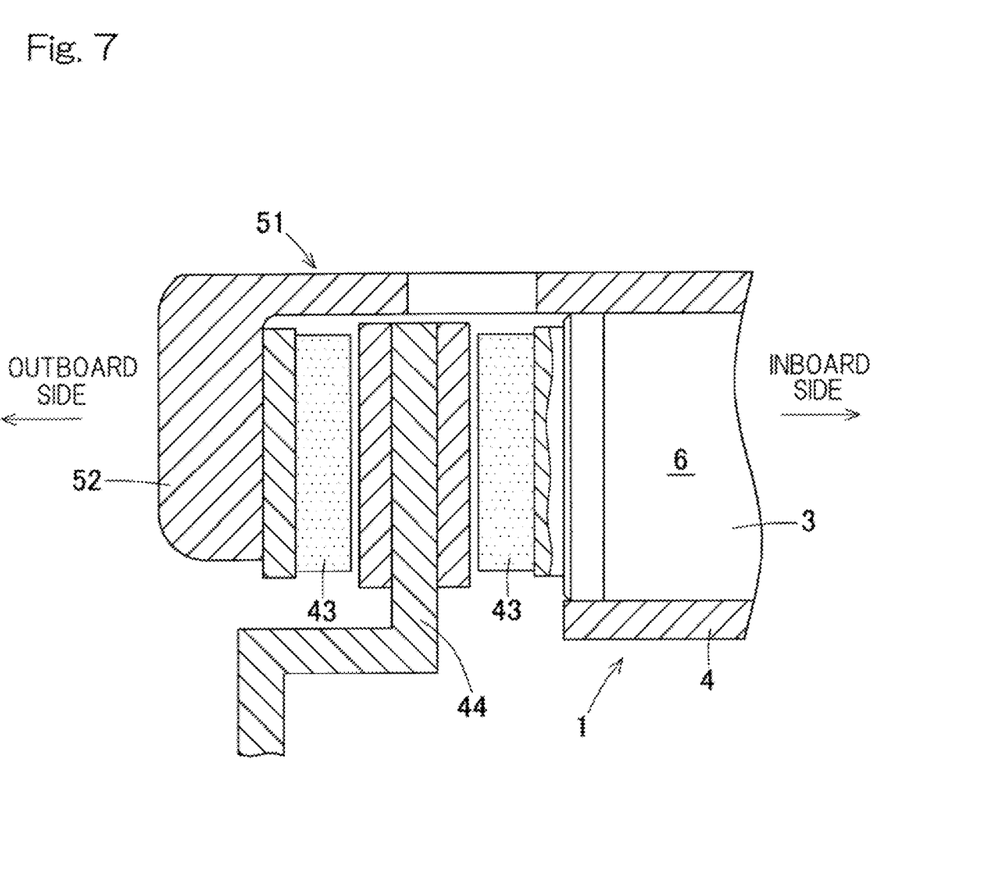
FIG. 7 is a partial longitudinal sectional view of an electric brake device provided with any one of electric linear actuators mentioned above.

The planetary rollers 39 are rotatably supported by the roller shafts 41, respectively. A circumferential groove or a helical groove which is meshed with the helical projection of the linear motion portion 6 is formed in the outer peripheral surface of each planetary roller 39. Each planetary roller 39 is disposed between the outer peripheral surface of the rotation input and output shaft 5 and the inner peripheral surface of the linear motion portion 6. Each planetary roller 39 is pressed against the outer peripheral surface of the rotation input and output shaft 5 by the urging force of the elastic ring 42. By the rotation input and output shaft 5 being rotated by the electric motor 2, each planetary roller 39 that is in contact with the outer peripheral surface of the rotation input and output shaft 5 rotates due to contact friction therebetween. Accordingly, the linear motion portion 6 moves in the axial direction, whereby friction pads 43 (FIG. 7) provided at the end in the axial direction of the linear motion portion 6 come into contact with or is separated from a brake rotor 44 (FIG. 7).

According to the electric linear actuator 1 describe above, the electric motor 2 is a so-called axial gap motor that includes the stator 7 and the rotor 8 which are disposed such that the orientations of the magnetic poles which generate interlinkage flux which contributes to the torque generation are parallel to the rotation axis of the electric motor 2. In addition, the linear motion mechanism 3 and the electric motor 2 are disposed in line along the same axis which serves as the axis of the rotation input and output shaft 5 of the linear motion mechanism 3. Thus, compared with a structure or the like in which the electric motor and the linear actuator are disposed in parallel to each other, useless space is reduced, space saving can be achieved, and improved torque density can be achieved. In addition, an electric linear actuator that has a small moment of inertia and high responsiveness can be realized.

The first and second coil terminals 53, 54 respectively have the extended portions 53*a*, 54*a* extended to the outer-diameter side in the radial direction with respect to the rotation axis L1, and the extended portions 53*a*, 54*a* are electrically connected to the control device CU through the wiring mechanism 55. Since the first and second coil terminals 53, 54 respectively have the extended portions 53*a*, 54*a* extended to the outer-diameter side in the radial direction, connection between the coils 11A, 11B of the electric motor 2 and the control device CU is facilitated, which is advantageous in achieving cost reduction and space saving. Accordingly, the mounting space can be reduced and the cost can be reduced.

Since a flat wire is used as the winding and this winding is wound so as to be stacked in the transverse direction, the electric motor 2 can be made compact in the axial direction of the rotation axis, and further space saving can be achieved.

Other embodiments are described. In the description below, parts corresponding to those previously described in the embodiment above are denoted by the same reference numerals, and redundant description thereof is omitted. When only a part of a configuration is described, the remaining part of the configuration is the same as that of the previously described embodiment unless otherwise specified. The same advantageous effects are achieved by the same configuration. In addition to the combination of parts described specifically in each embodiment, it is also possible to partially combine the embodiments unless any problem is particularly posed due to the combination.

Figure 4:
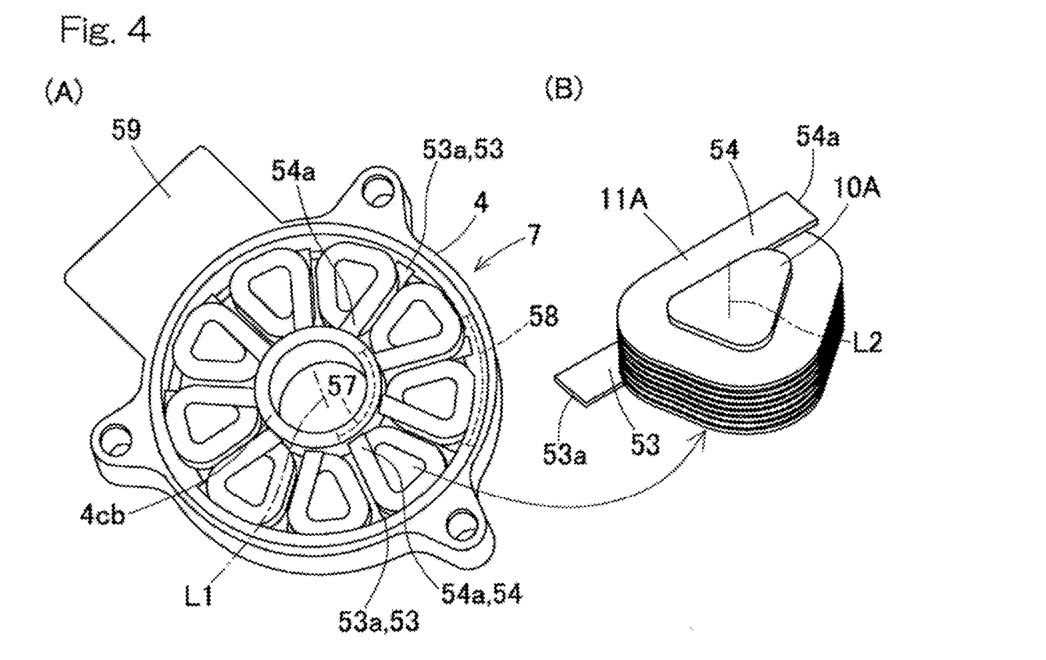
FIG. 4 shows a stator of an electric motor in an electric linear actuator according to another embodiment of the present invention, in which Chart (A) is a perspective view showing a schematic shape of the entirety thereof, and Chart (B) is an enlarged perspective view of the shape of only a coil of the stator.

As shown in chart (A) of FIG. 4 and chart (B) of FIG. 4, of opposite end portions (first and second coil terminals 53, 54) of the winding forming the flat wire coil 11A, the first coil terminal 53 has the extended portion 53a extended to the outer-diameter side in the radial direction with respect to the rotation axis L1, and the second coil terminal 54 has the extended portion 54a extended to the inner-diameter side in the radial direction with respect to the rotation axis L1. The extended portions 53a, 54a at the outer diameter side and the inner diameter side are respectively connected to the bus bars 57, 58 (FIG. 3).

In this example, in addition to the bus bar 58 insert-molded in the outer peripheral portion of the stator housing of the housing 4, the bus bar 57 is insert-molded in the boss portion 4cb at the inner diameter side. The extended portion 54a at the inner diameter side is connected to the neutral point 56 (see FIG. 3) through the bus bar 57 in the boss portion 4cb. The extended portion 53a at the outer diameter side is connected to the control device CU (FIG. 3) through the bus bar 58 in the outer peripheral portion of the housing 4 and the connector 59. Similar to the bus bar at the outer diameter side described above, the bus bar 57 at the inner diameter side may also be formed by a wiring member provided separately from the housing 4, a harness, or the like.

According to this configuration, the one extended portion 53a is extended to the outer-diameter side in the radial direction with respect to the rotation axis L1, and the other extended portion 54a is extended to the inner-diameter side in the radial direction with respect to the rotation axis L1 and connected to the neutral point 56 (FIG. 3). Thus, the wiring length can be further reduced than in the embodiment described above. Therefore, this configuration is preferable in achieving loss reduction and material cost reduction.

Figure 5:
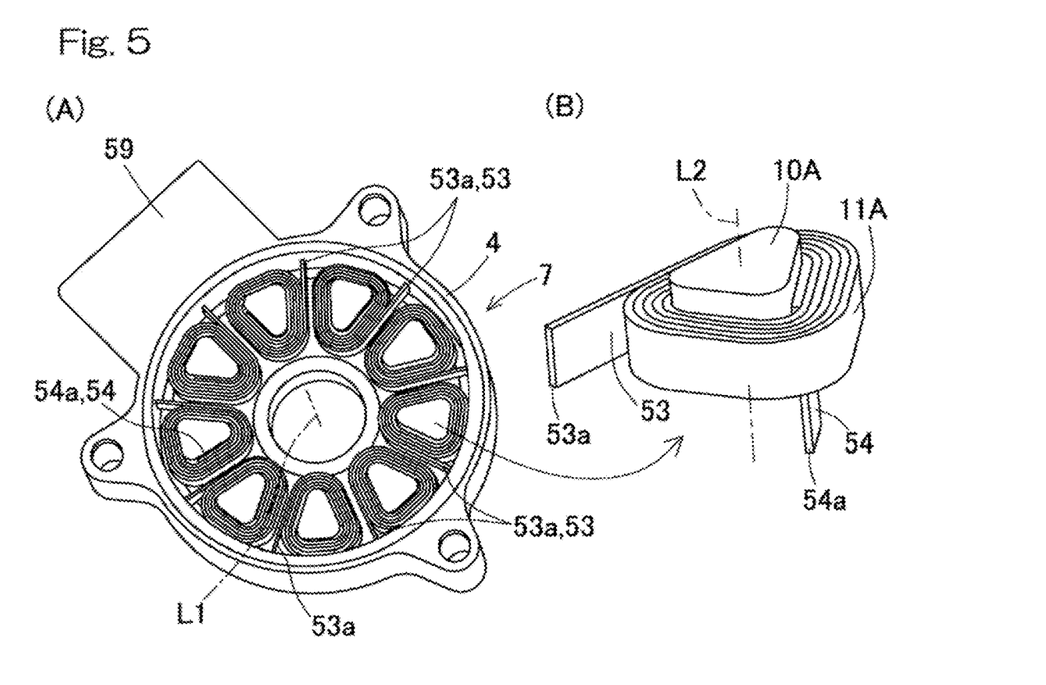
FIG. 5 shows a stator of an electric motor in an electric linear actuator according to still another embodiment of the present invention, in which Chart (A) is a perspective view showing a schematic shape of the entirety thereof, and Chart (B) is an enlarged perspective view of the shape of only a coil of the stator.

As shown in chart (A) of FIG. 5 and chart (B) of FIG. 5, the winding forming the flat wire coil 11A has a rectangular-shaped cross section on a plane that is parallel to the axis L2 of the winding. The winding is disposed such that: the longitudinal direction of the rectangular-shaped cross section of the winding is parallel to the rotation axis L1; and the transverse direction of the rectangular-shaped cross section of the winding is orthogonal to the rotation axis L1. The winding is wound so as to be stacked in the transverse direction.

The first coil terminal 53 of this winding has the extended portion 53a extended to the outer-diameter side in the radial direction with respect to the rotation axis L1, and the second coil terminal 54 has the extended portion 54a extended in parallel to the axial direction of the rotation axis L1 (or axis L2). The extended portion 54a of the second coil terminal 54 extends along the axial direction at one side (of the triangle) of the magnetic body core 10A. If a through-hole in the axial direction is provided in the vicinity of the coil arrangement portion at the bottom face of the housing shown in chart (A) of FIG. 5, and a plurality of the extended portions 54a are connected at the bottom face of the housing, a separate cover or the like can be used as a casing.

In this configuration, if the wiring mechanism 55 shown in FIG. 3 is employed and the extended portions 54a of the second coil terminals 54 are connected to the neutral points 56, the wiring length can be reduced. Therefore, this configuration is preferable in achieving loss reduction and material cost reduction.

Figure 6:
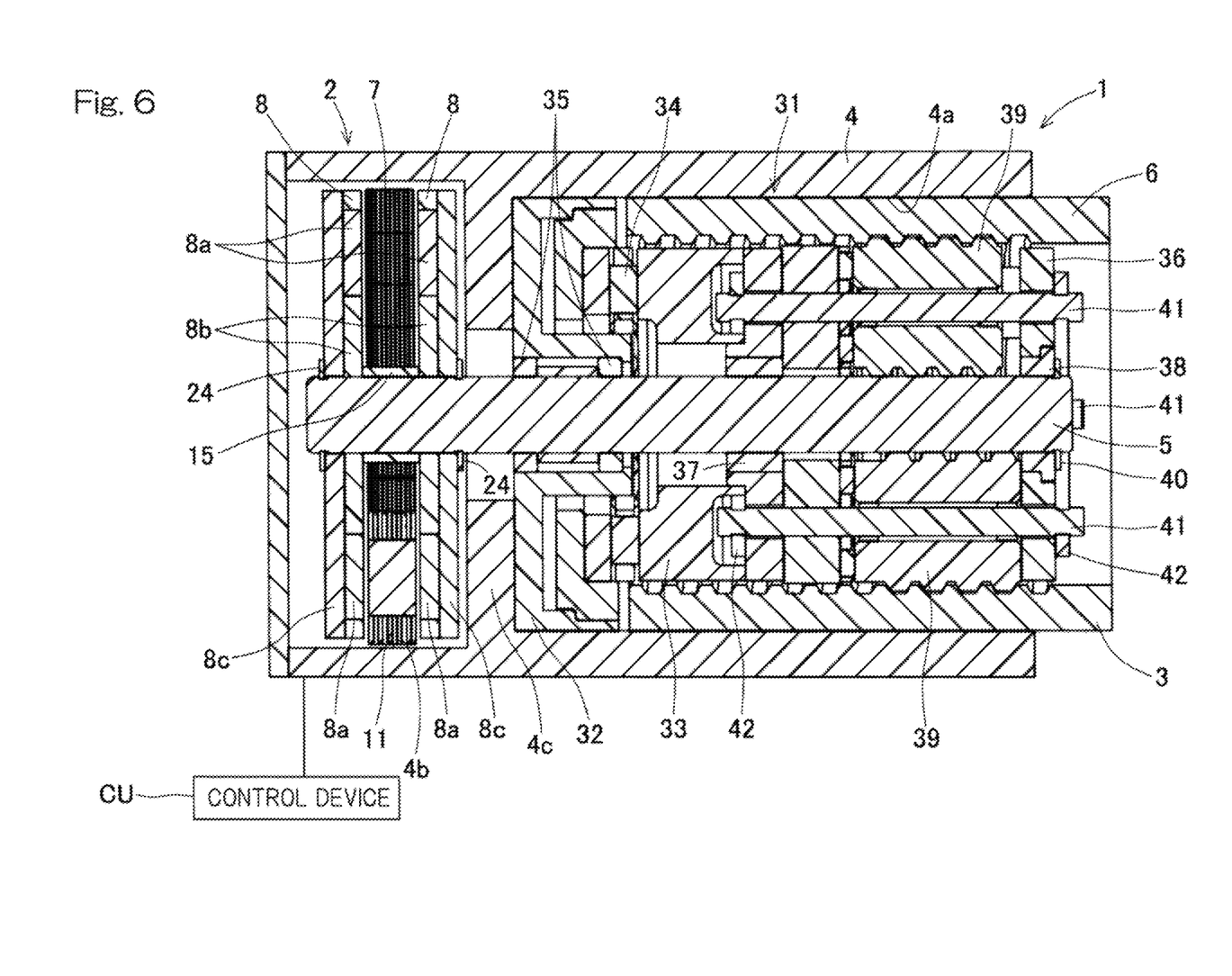
FIG. 6 is a longitudinal sectional view of an electric linear actuator according to still another embodiment of the present invention.

As for the electric linear actuator 1 shown in FIG. 6, an example is shown in which, as the electric motor 2, an axial gap motor having a double rotor structure is used in which: the stator 7 having magnetic poles at both faces in the axial direction is disposed in the middle; and the rotors 8, 8 are disposed at both sides of the stator 7. This structure is preferable in suppressing copper loss.

Each rotor 8 includes: the permanent magnet 8a; the holder 8b which holds the permanent magnet 8a; and a back yoke 8c. Two retaining rings 24, 24 are provided at the outer peripheral surface of an end portion of the rotation input and output shaft 5. A collar 15 is disposed in contact with the outer peripheral surface, and the rotors 8, 8 are positioned in the axial direction and fixed between the retaining rings 24 and the collar 15. The stator 7 is disposed at the inner side of the motor accommodation portion 4b, for example, and is disposed so as to be in contact with the motor accommodation portion 4b.

Also in this configuration, if one or both of the first and second coil terminals 53, 54 (FIG. 2, 4, 5) have the extended portions 53a, 54a extended in the outer-diameter side in the radial direction, connection between the coil 11 of the electric motor 2 and the control device CU is facilitated, which is advantageous in achieving cost reduction and space saving.

Although not shown, the electric linear actuator may use a single-rotor-type axial gap motor in which each of the stator and the rotor has a torque generation surface at only one face thereof. In such a case where the required motor torque is relatively small, this structure is preferable in configuring an actuator that achieves further space saving.

FIG. 7 is a partially cut longitudinal sectional view of an electric brake device provided with any one of the electric linear actuators 1 described above. The electric brake device basically includes: any one of the electric linear actuators 1 described above; the brake rotor 44 which is a rotary member which rotates integrally with a wheel; and friction pads 43 which come into contact with the brake rotor 44 to generate a braking force. The electric brake device further includes a control device (not shown) which controls the electric linear actuator. In the vehicle, a caliper 51 is provided so as to surround the outer periphery side portion of each brake rotor 44. The caliper 51 is provided integrally with the housing 4 of the electric linear actuator 1.

A claw portion 52 is provided to an end portion at the outboard side of the caliper 51. The claw portion 52 is opposed, in the axial direction, to the side face at the outboard side of the brake rotor 44. The friction pad 43 at the outboard side is supported by the claw portion 52. In the caliper 51, the friction pad 43 at the inboard side is supported at the outboard-side end of the linear motion portion 6 of the linear motion mechanism 3. This friction pad 43 is opposed, in the axial direction, to the side face at the inboard side of the brake rotor 44. The electric linear actuator 1 performs drive of causing the friction pads 43 to be brought into contact with or separated from the brake rotor 44.

A mount (not shown) is supported by a knuckle (not shown) in the vehicle. At opposite end portions in the longitudinal direction of the mount, a pair of pin support pieces (not shown) is provided. At each end portion of each of the pin support pieces, a slide pin (not shown) extending in parallel to the axial direction is provided. The caliper 51 is supported by the slide pins so as to be slidable in the axial direction.

The control device CU (see FIG. 1, etc.) controls rotation of the electric motor of the electric linear actuator 1 in accordance with the operation amount of the brake pedal (not shown). At the time of braking, due to the drive by the electric linear actuator 1, the friction pad 43 at the inboard side comes into contact with the brake rotor 44, thereby pressing the brake rotor 44 in the axial direction. Due to the counterforce of the pressing force, the caliper 51 slides to the inboard side. Accordingly, the friction pad 43 at the outboard side supported by the claw portion 52 of the caliper 51 comes into contact with the brake rotor 44. The brake rotor 44 is strongly sandwiched from both sides in the axial direction by the friction pads 43, 43 at the outboard side and the inboard side, whereby a braking force is applied to the brake rotor 44.

According to this configuration, space saving of the electric linear actuator 1 can be achieved. Thus, this electric brake device can be mounted also to a vehicle that has a very limited mounting space for the electric linear actuator 1. Thus, versatility or availability of the electric brake device can be enhanced, and this electric brake device can be mounted to various types of vehicles.

As for the rotor, if the permanent magnet is held by a holder formed from a nonmagnetic material, loss is small and such a rotor is considered to be preferable. However, the permanent magnet can also be held by a holder formed from a magnetic material. The rotor may be structured such that, with no holder used, a single magnet magnetized with a plurality of magnetic poles in the axial direction is directly fixed to the rotation input and output shaft.

As to the permanent magnet in the rotor, if a magnet penetrating in the axial direction is applied and the both surfaces of the magnetic poles are used for generating interlinkage flux, the magnet volume, the motor dimensions, and the number of components can be reduced, and thus, such a configuration is considered as preferable in achieving cost reduction and space saving. However, a structure may be employed in which magnets are attached or stuck to both surfaces of a magnetic body, thereby improving the heat resistance.

Other than these, the electric motor may employ a configuration of a reluctance motor which uses an iron core having a shape that contributes or allows variation of stator inductance due to rotation of the rotor, for example.

As the conversion mechanism portion of the linear motion mechanism, it is possible to use, instead of the planetary roller: various types of screw mechanisms such as a ball screw; mechanisms that use the slope of a ball ramp, etc.; and the like. The arrangement of the thrust bearing in each embodiment is on the assumption that operation of pressing a target object is performed by the electric linear actuator. However, it is also possible to configure an actuator in which: the thrust bearing is disposed to hold a load at the reverse side of that in the shown example in the drawing; and a tensile load is applied to a target object.

In the wiring mechanism, the neutral points at the parallel star connections may be provided separately for each circuit as shown in FIG. 3. Alternatively, a single neutral point that connects all the star connections may be provided. Other than the star connection, for example, delta connection may be formed, or a wiring mechanism in which series connection is formed may be employed.

Other than these, for example, for the purpose of improving the torque density, in order to utilize the interlinkage flux at the outer diameter side, a plurality of coils that are adjacent to each other in the circumferential direction of the stator 7 may be disposed so as to have the same phase, in such an order of U phase-U phase-V phase-V phase-W phase-W phase. It is understood that the coils that are adjacent to each other in the circumferential direction may be disposed so as to have different phases from each other, in such an order of U phase-V phase-W phase-U phase-V phase-W phase.

As for the coil applied to the electric linear actuator, concentrated winding that can reduce the winding dimensions is considered to be preferable. However, a distributed winding configuration may be employed. Other than this, the molding method, the arrangement, or the like of the wiring are designed as appropriate in accordance with the shape of the housing or the like. In addition, configurations that are necessary for application of the electric linear actuator, such as a motor angle sensor which detects the motor angle, a thermistor, and wiring components for electrical equipment systems, are provided as appropriate.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . electric linear actuator
2 . . . electric motor
3 . . . linear motion mechanism
4 . . . housing
5 . . . rotation input and output shaft
6 . . . linear motion portion
7 . . . stator
7A, 7B . . . first, second excitation mechanisms
8 . . . rotor
11 . . . coil
11A, 11B . . . first, second coils (flat wire coils)
11U, 11V, 11W . . . coil groups
53, 54 . . . first, second coil terminals
53a, 54a . . . extended portions
55 . . . wiring mechanism
56 . . . neutral point
CU . . . control device

What is claimed is:
1. An electric linear actuator comprising:
an electric motor;
a linear motion mechanism having a rotation input and output shaft and configured to convert, through the rotation input and output shaft, rotary motion of the electric motor into linear motion of a linear motion portion;
a housing configured to hold the linear motion mechanism; and
a control device configured to control the electric motor, wherein
the linear motion mechanism and the electric motor are disposed in line along a same axis which serves as an axis of the rotation input and output shaft of the linear motion mechanism,
the electric motor includes a stator and a rotor which are disposed such that orientations of magnetic poles which generate interlinkage flux which contributes to torque generation are parallel to a rotation axis of the electric motor, the stator includes an excitation mechanism which includes a coil configured to convert current applied to the electric motor into the interlinkage flux, the electric linear actuator further comprises
a wiring mechanism including a bus bar configured to electrically connect the coil and the control device, and one or both of opposite end portions of a winding of the coil have an extended portion extended in a radial direction with respect to the rotation axis, and the bus bar of the wiring mechanism being connected to the extended portion of the winding coil and connected to the control device so the extended portion of the winding coil is connected to the control device through the bus bar.

2. The electric linear actuator as claimed in claim 1, wherein
the winding forming the coil has a rectangular-shaped cross section on a plane that contains an axis of the winding,
the winding is disposed such that: a longitudinal direction of the rectangular-shaped cross section of the winding is orthogonal to the rotation axis; and a transverse direction of the rectangular-shaped cross section of the winding is parallel to the rotation axis, and
the winding is wound so as to be stacked in the transverse direction.

3. The electric linear actuator as claimed in claim 2, wherein
an extended portion of one of the opposite end portions of the winding is extended to an outer-diameter side in the radial direction with respect to the rotation axis, and an extended portion of another of the opposite end portions of the winding is extended to an inner-diameter side in the radial direction with respect to the rotation axis.

4. The electric linear actuator as claimed in claim 3, wherein
the excitation mechanism includes coil groups, that correspond to respective phases of three-phase alternating current, and
in the wiring mechanism,
star connection is formed such that the coils have at least one neutral point,
the extended portion of the other of the opposite end portions of the winding is connected to the neutral point, and
the extended portion of the one of the opposite end portions of the winding is connected to the control device which controls the three-phase alternating current.

5. The electric linear actuator as claimed in claim 1, wherein
the winding forming the coil has a rectangular-shaped cross section on a plane that is parallel to the axis of the winding,
the winding is disposed such that: a longitudinal direction of the rectangular-shaped cross section of the winding is parallel to the rotation axis; and a transverse direction of the rectangular-shaped cross section of the winding is orthogonal to the rotation axis, and
the winding is wound so as to be stacked in the transverse direction.

6. The electric linear actuator as claimed in claim 5, wherein
an extended portion of one of the opposite end portions of the winding is extended to an outer-diameter side in the radial direction with respect to the rotation axis, and an extended portion of another of the opposite end portions of the winding is extended in parallel to an axial direction of the rotation axis.

* * * * *